(12) United States Patent
Conroy (10) Patent No.: US 11,828,608 B1
(45) Date of Patent: Nov. 28, 2023

(54) CONTROLLING VEHICLES IN A COMPLEX ECOSYSTEM

(71) Applicant: Joseph E. Conroy, Acton, MA (US)

(72) Inventor: Joseph E. Conroy, Acton, MA (US)

(*) Notice: Subject to any disclaimer, the term of this patent is extended or adjusted under 35 U.S.C. 154(b) by 44 days.

(21) Appl. No.: 17/712,912

(22) Filed: Apr. 4, 2022

Related U.S. Application Data (60) Provisional application No. 63/170,239, filed on Apr. 2, 2021.

(51) Int. Cl.
*G01C 21/34* (2006.01)

(52) U.S. Cl.
CPC ..... *G01C 21/3438* (2013.01); *G01C 21/3461* (2013.01); *G01C 21/3484* (2013.01)

(58) Field of Classification Search
CPC ............ G01C 21/3438; G01C 21/3461; G01C 21/3484
See application file for complete search history.

(56) References Cited

U.S. PATENT DOCUMENTS

| | | | | |
|---|---|---|---|---|
| 9,883,352 | B2* | 1/2018 | Wirola | H04W 4/029 |
| 10,111,048 | B2* | 10/2018 | Wirola | H04W 4/33 |
| 11,354,469 | B2* | 6/2022 | Alhubail | G01V 99/005 |
| 2006/0240843 | A1* | 10/2006 | Spain, Jr. | H04W 4/029 |
| | | | | 455/456.1 |
| 2016/0161269 | A1* | 6/2016 | Needham | G01C 21/3438 |
| | | | | 701/410 |
| 2016/0192157 | A1* | 6/2016 | Wirola | H04W 4/029 |
| | | | | 455/456.1 |
| 2016/0307287 | A1* | 10/2016 | Jat | G01C 21/3438 |
| 2017/0284816 | A1* | 10/2017 | Greenspan | G01C 21/3492 |
| 2018/0109925 | A1* | 4/2018 | Wirola | H04W 4/029 |
| 2020/0175217 | A1* | 6/2020 | Alhubail | G06F 30/28 |

* cited by examiner

*Primary Examiner* — Tyler J Lee
(74) *Attorney, Agent, or Firm* — Jonathan B. David (57) ABSTRACT

At least one three-dimensional roadway segment cuboid nodal system and at least one stationary resource node subsystem(s) includes a computing device comprising at least a memory, a processor, and processing logic for execution in the processor. The processing logic is configured to acquire information regarding a mobile node and the three-dimensional roadway segment cuboid subsystem(s). The information includes a location of the mobile node and a location of the roadway segment cuboid subsystem(s) and a type of use of the mobile node and roadway segment cuboid subsystem(s) to identify and determine acceptable usage.

20 Claims, 5 Drawing Sheets

CONTROLLING VEHICLES IN A COMPLEX ECOSYSTEM

CROSS REFERENCE TO RELATED APPLICATIONS

This application claims the benefit of U.S. Provisional Application Ser. No. 63/170,239 filed Apr. 2, 2021, entitled "Controlling Vehicles in a Complex Ecosystem," which is incorporated herein by reference. In this case, the claims should be interpreted to be consistent with the language in this case.

TECHNICAL FIELD

The present disclosure generally relates to the management and control of vehicles in a complex environment through a digital twin network of distributive stationary and mobile nodes and multi-dimensional roadway segment assemblies and functional use channels.

BACKGROUND

Smart Cities continue to grow in population and the advancement in Communication Networks, Artificial Intelligence, TinyML, Distributive Edge Computing, Connected Vehicles, Personnel Smart Phones, Smart Streets Roadway Sensors and Controls, are enabling an ecosystem of connected nodes that provide functionality for safer, sustainable, and more equitable environments.

Urban Planners and Designers are applying new sustainability policies for a new Human Mobility, with Livable Streets and Equitable Neighborhoods. Additional uses of urban streets including—bike lanes, driverless cars, ridesharing, buses, first/last mile delivery, drones, parking, vehicle charging stations and outdoor dining ect.

Regional Planners and Designers are also implementing a new Mobility 360 integration of services with "Just-In-Time" scheduling and Coordination of travel modes for Human Mobility. With the advancement of intelligent transportation infrastructures and systems, a new Mobility of connected nodes and assemblies are providing the capability for new ecosystem for safer, equitable and sustainable environments.

Current management systems do not holistically integrate the subsystems of mobile functional vehicle use with roadway usage and policies. Accordingly, a need exists for Smart Cities systems to thereby integrate the subsystems of mobile vehicle functional use and roadway usage and policies.

SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

The aforementioned aspects and other objectives can now be achieved as described herein.

In an embodiment, an event management system includes a first nodal subsystem associated with a stationary resource node (SRN). The event management system also includes a second nodal subsystem associated with a cuboid event processing unit (CEPU). The event management system also includes a third nodal subsystem associated with a mobile node (MN). The event management system also includes at least one three-dimensional (3D) roadway segment cuboid (RSC) nodal subsystem coupled to at least one or more distributed stationary resource node(s) (SRN) subsystem(s) located to selectively control a flow of the at least one MN through a specific portion of a roadway. Further, the event management system also includes the at least one cuboid event processing unit (CEPU) nodal subsystem coupled to the at least RSC subsystem located to selectively control the flow of the at least one MN through the specific portion of the roadway. The event management system also includes a communications network communicatively linking each of the at least one CEPU subsystem and the at least one 3D RSC subsystem and the one or more SRN subsystem(s) and at least one MN subsystem to allow communications therebetween. The at least one CEPU subsystem and the least one MN subsystem and the one or more SRN subsystem(s) each include a computing device comprising at least a memory, a processor, and processing logic for execution in the processor. The at least one 3D RSC nodal subsystem includes a computing device comprising at least a memory, a processor, and processing logic for execution in the processor. The processing logic is configured and arranged for acquiring information regarding the at least one MN and the at least one 3D RSC subsystem. The information includes a location of the at least one MN and a location of the at least one 3D RSC subsystem. The information also includes a type of use for the at least one MN and a type of use of the at least one 3D RSC subsystem to identify and determine acceptable usage.

The at least one CEPU subsystem includes the computing device that includes a graphic user interface (GUI).

The at least one MN subsystem includes the computing device comprising a graphic user interface (GUI).

The CEPU nodal subsystem selectively controls the at least one MN within its designated roadway segment cuboid channel according to a roadway policy.

BRIEF DESCRIPTION OF THE FIGURES

The accompanying figures, in which like reference numerals refer to identical or functionally similar elements throughout the separate views and which are incorporated and form a part of the specification, further illustrate the present invention and, together with the detailed description of the invention, serve to explain the principles of the present invention.

Unless otherwise indicated illustrations in the figures are not necessarily drawn to scale.

DETAILED DESCRIPTION OF SOME EMBODIMENTS

Background and Context

The particular values and configurations discussed in these non-limiting examples can be varied and are cited merely to illustrate one or more embodiments and are not intended to limit the scope thereof.

Subject matter will now be described more fully herein after with reference to the accompanying drawings, which form a part hereof, and which show, by way of illustration, specific example embodiments. Subject matter may, however, be embodied in a variety of different form and, therefore, covered or claimed subject matter is intended to be construed as not being limited to any example embodiments set forth herein, example embodiments are provided merely to be illustrative. Likewise, a reasonably broad scope for claimed or covered subject matter is intended. Among other issues, subject matter may be embodied as methods, devices, components, or systems. The followed detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as a "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

One having ordinary skill in the relevant art will readily recognize the subject matter disclosed herein can be practiced without one or more of the specific details or with other methods. In other instances, well-known structures or operations are not shown in detail to avoid obscuring certain aspects. This disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Unless defined otherwise, all technical and scientific terms used herein have the same meanings as commonly understood by one of ordinary skill in the art to which the disclosed embodiments belong. Preferred methods, techniques, devices, and materials are described, although any methods, techniques, devices, or materials similar or equivalent to those described herein may be used in the practice or testing of the present invention.

Although claims have been included in this application to specific enumerated combinations of features, it should be understood the scope of the present disclosure also includes any novel feature or any novel combination of features disclosed herein.

References "an embodiment," "example embodiment," "various embodiments," "some embodiments," etc., may indicate that the embodiment(s) so described may include a particular feature, structure, or characteristic, but not every possible embodiment necessarily includes that particular feature, structure, or characteristic.

Headings provided are for convenience and are not to be taken as limiting the present disclosure in any way.

Each term utilized herein is to be given its broadest interpretation given the context in which that term is utilized.

Terminology

The following paragraphs provide context for terms found in the present disclosure (including the claims):

The transitional term "comprising", which is synonymous with "including," "containing," or "characterized by," is inclusive or open-ended and does not exclude additional, unrecited elements or method steps. See, e.g., *Mars Inc. v. H.J. Heinz Co.*, 377 F.3d 1369, 1376, 71 USPQ2d 1837, 1843 (Fed. Cir. 2004) ("[L]ike the term 'comprising,' the terms 'containing' and 'mixture' are open-ended."). "Configured to" or "operable for" is used to connote structure by indicating that the mechanisms/units/components include structure that performs the task or tasks during operation. "Configured to" may include adapting a manufacturing process to fabricate components that are adapted to implement or perform one or more tasks.

"Based On." As used herein, this term is used to describe factors that affect a determination without otherwise precluding other or additional factors that may affect that determination. More particularly, such a determination may be solely "based on" those factors or based, at least in part, on those factors.

All terms of example language (e.g., including, without limitation, "such as", "like", "for example", "for instance", "similar to", etc.) are not exclusive of other examples and therefore mean "by way of example, and not limitation. . . ."

A description of an embodiment having components in communication with each other does not infer that all enumerated components are needed.

A commercial implementation in accordance with the scope and spirit of the present disclosure may be configured according to the needs of the particular application, whereby any function of the teachings related to any described embodiment of the present invention may be suitably changed by those skilled in the art.

The block diagrams in the figures illustrate the architecture, functionality, and operation of possible implementations of systems and methods according to various embodiments. Functions noted in the block may occur out of the order noted in the figures. For example, two blocks shown in succession may, in fact, be executed substantially concurrently, or the blocks may sometimes be executed in the reverse order, depending upon the functionality involved.

Further, any sequence of steps that may be described does not necessarily indicate a condition that the steps be performed in that order. Some steps may be performed simultaneously.

The functionality and/or the features of a particular component may be alternatively embodied by one or more other devices that are not explicitly described as having such functionality/features. Also, various embodiments of the present invention need not include a device itself.

More specifically, as will be appreciated by one skilled in the art, aspects of the present invention may be embodied as a system and/or method. Furthermore, aspects of the present invention may take the form of a plurality of systems.

Introduction

More specifically, as will be appreciated by one skilled in the art, aspects of the present invention may be embodied as a system and/or method. Furthermore, aspects of the present invention may take the form of a plurality of systems.

This invention provides a system for receiving, processing, and transmitting data from both stationary and mobile physical components via multi-dimensional distributed roadway segment cuboid component assemblies so as to enable functional use capabilities for the optimization and control of vehicle flow, including the capability to create event based specific roadway segment assignments and coordination for prioritized user group(s), through predictive use, triggering of traffic signaling(s), and real time navigational GUI interfaces.

Urban streets are more congested and urban policies are designating different uses of mobility—bike lanes, driverless cars, electric vehicles, ridesharing, buses, parking, charging stations. Moreover, the ecosystem of urban travel is being used in a new way with smarter connected infrastructure and connected vehicles with faster networks. These nodes both fixed and mobile are siloed and independent groups that operate independently the Roadway Segment Cuboid enables (the Physical Nodes through a network) interconnected functionality, thereby benefiting quality of life including emergency response and sustainability.

While there are roadway policies of use, there is no functional integration of mobile vehicle use with the various roadway segments and their policy and attribute associations.

These connected nodes, being both fixed (Stationary) and moving (Mobile), are siloed and independent subsystems. The 3D Roadway Segment Cuboid and its 3D Roadway Segment Cuboid Channel(s) provide a distributive clustered network of interconnected stationary and mobile node assemblies. The 3D Roadway Segment Cuboid with its unique identifier, creates the subsystem(s) component assemblies of physical nodes with specific functional use channels within the 3D Roadway Segment Cuboid. Local policy rule(s) of roadway segment usage are integrated with the varying mobile node(s) of functional use type(s) event(s) providing the control and optimization for the Ecosystem.

With the clustering of these distributive edge 3D Roadway Segment Cuboids being coupled to the Cuboid Event Processing Unit engine; the capability is also created for providing an application of machine learning of the 3D Roadway Segment Cuboids from the historical usage of mobile node functional use events and predictive analysis and probabilities. The Digital Twin based Cuboid Event Processing unit provides the intelligence for optimization and control for Human Mobility event(s), including connected vehicle compliance and usage, vehicle fleet coordination and clustered roadway segment control for creating unobstructed travel for emergency responders. The machine learning component of the Cuboid Event Processing Unit provides real time redirection of Mobile Node constraints through the triggering of distributed traffic controls, embedded navigational layers and real-time notifications resulting in a subset of Roadway Segments links which create unobstructed flow(s) for time critical emergency response(s), resulting in improved quality of life and faster response times.

Current transportation systems do not holistically interconnect the subsystems of mobile node functional usage with the physical nodes and characteristics of the roadway infrastructure. The Roadway Segment Cuboid is a system component assembly enabling the capability for managing historical, planned, and real time events. The Roadway Segment Cuboid also serves as a system component assembly, providing large data sets with the unique identifier for referential integrity of internal and external data sources and Cuboid Event Processing Unit applications including Digital Twin Clustering, Machine Learning, Artificial Intelligence, and embedded User Navigational Feeds.

System Structure

Figure 1A:
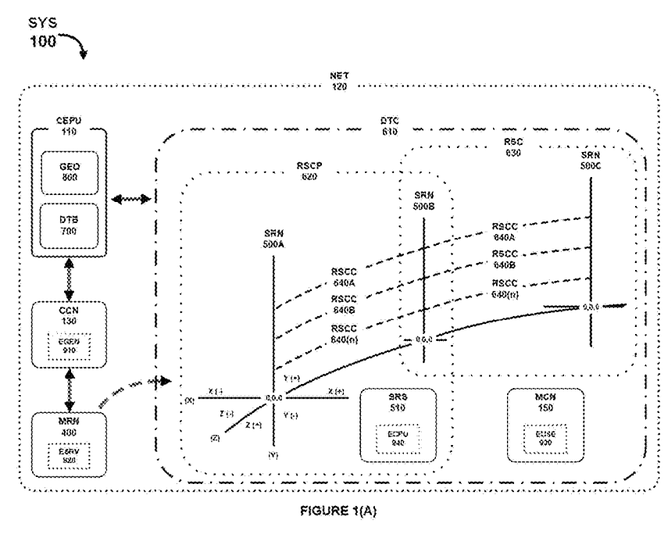
FIG. 1(A) illustrates a diagram of a Roadway Segment Cuboid Channel System, which can be implemented in accordance with an embodiment.
Figure 1B:
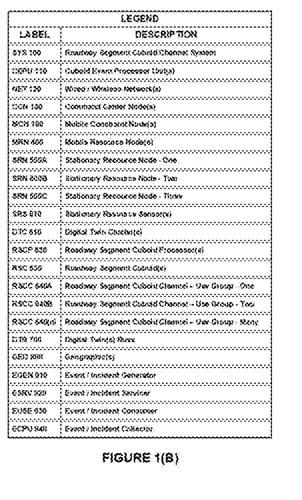
FIG. 1(B) illustrates a Legend of FIG. 1(A) of the Roadway Cuboid Channel System diagram.

Referring to FIGS. 1(A) and 1(B), a block diagram and legend of an event management system/roadway segment cuboid channel system 100 is illustrated. The event management system 100 includes a cuboid event processing unit (CEPU) 110. The CEPU 110 also includes geographic(s) (GEO) 800 and digital twin(s) buses (DTB) 700. The CEPU 110 is coupled to a command center node (CCN) 130. The CCN 130 includes an event/incident generator (EGEN) 910. The CCN 130 and CEPU 110 are both coupled to a mobile resource node(s) (MRN) 400. The MRN 400 can be dispatched or notified of a location within a Digital Twin Cluster 610, as will be later explained in FIGS. 4(A)-(C). Moreover, the MRN 400 can be a drone, a ride sharing vehicle, a driverless vehicle, and a public transportation vehicle in or more embodiments that the CEPU 110 selectively controls according to a roadway policy. As such, the MRN 400 will be a type of vehicle with an intended use that will be selectively controlled to follow a specific portion of a roadway according to a roadway policy. Emergency response vehicles can have exceptions to any roadway policies, and can use any roadway segment cuboid channel while responding to an emergency incident. As such, while emergency response vehicles are part of the MRN 400 service group, they are not controlled to follow specific portions of a roadway through the CEPU 110 predictive engine that clears the probable path to an incident location and redirects other Mobile Constraint Nodes 150.

Still referring to FIG. 1(A), Digital Twin Cluster (DTC) 610 is illustrated with the subsystems of Roadway Segment Cuboids RSC 630 and Roadway Segment Cuboid Processors 620. The DTC 610 is coupled to the CEPU 110, CCN 130, and MRN 400.

Still referring to FIG. 1(A), stationary resource nodes (SRN) 500A, 500B, and 500C are illustrated. The SRNs 500A, 500B, and 500C are stationed on stationary axis's in three dimensions as represented by x, y, and z coordinates. The SRN's 500A, 500B, and 500C can include signs on roadways including traffic lights that direct vehicular traffic or provide notice of roadway conditions. Also illustrated are Roadway Segment Cuboid Channels (RSSC) 640A, 640B, and 640(n). The RSSC's 640A, 640B, and 640(n) represent specific portions of a Roadway Cuboid Segments that the one or more MRNs 400 will be selectively controlled based on roadway policy. Configured above the SRNs 500A, 500B, and 500C is the roadway segment cuboid processor (RSCP) 620 and the roadway segment cuboid (RSC) 630. The RSCP 620 is coupled to the CEPU 110, wherein both the RSCP 620 and CEPU 110 include a computing device that includes a memory and processor and processing logic. Both the RSCP 620 and the CEPU 110 selectively control a flow of the MRN 400 within the specific portion of a roadway, or within the specific portion of at least one of the RSCC's 640A, 640B, and 640(n).

In FIG. 1(A), positioned below the RSSC's 640A, 640B, and 640n is a stationary resource sensor (SRS) 510. The SRS 510 includes an event/incident collector ECPU 940. The SRS 510 will be able to identify information about the MRN 400 when the MRN 400 is travelling within one of the RSCC's 640A, 640B, or 640n according to the roadway policy. A mobile constraint node MCN 150 is also shown. The MCN 150 also includes an event/incident consumer EUSE 930. The MCN 150 will be coupled to the CEPU 110 by the processing unit within the SRS 510. The MCN 150 can work in conjunction with the SRS 510 while the MRN 400 is travelling within one of the RSSC's 640A, 640B, or 640n according to the specific roadway policy. The MRN 400 also travels within a digital twin cluster(s) DTC 610. The DTC 610 is also part of a wired/wireless network(s) (NET) 120.

With respect to FIG. 1(B), the legend illustrates the various components of the Roadway Segment Cuboid Channel System SYS 100 and NET 120 for clarity. The system 100 is essentially networked within the NET 120. Within the NET 120 is the DTC 610 that is coupled to the CEPU 110, CCN 130, and MRN 400. Within the DTC 610 are the RSCP 620 and the RSC 630. The RSCC's 640A, 640B, and 640(n) are located within the RSCP 620 and RSC 630. The SRS 510 is located within the RSCP 620, while the MCN 150 is coupled to the CEPU 110 by the processing unit within the SRS 510, and is located within the DTC 610. Moreover, each variable is illustrated as shown in FIG. 1(A) for clarity purposes. In addition, the variables are recurring in FIGS. 2-4(C).

Figure 2:
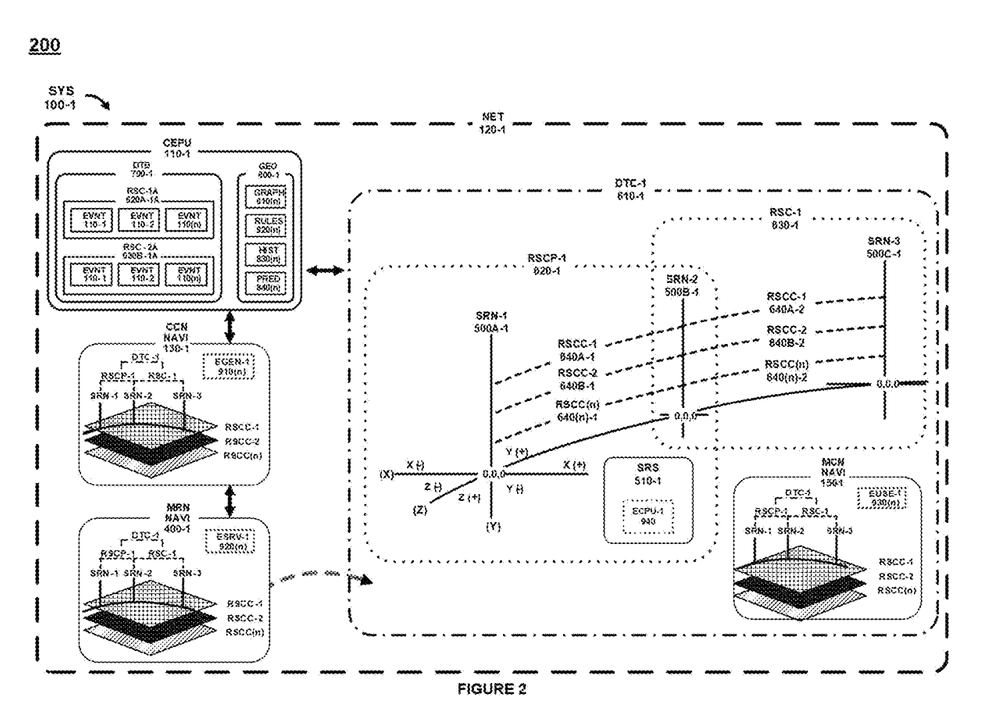
FIG. 2 illustrates another diagram of a Roadway Segment Cuboid Channel System implemented in accordance with an embodiment.

Referring to FIG. 2, another embodiment of an event management system 200 is shown. Many of the variables in the event management system 200 are substantially similar to the variables described above in FIGS. 1(A) and 1(B). The SYS 100-1 includes a NET 120-1. Within the NET 120-1, a CEPU 110-1 is illustrated. The CEPU 110-1 includes a DTB 700-1 and GEO 800-1. The DTB 700-1 includes a RSC-1A 620A-1A that includes events (EVNT) 110-1, 110-2, and 110-3. The DTB 700-1 also includes RSC-2A 630B-1A that also includes EVNT 110-1, 110-2, and 110-3. The GEO 800-1 includes a GRAPH 810(n), RULES 820(n), History (HIST) 830(n), and a (PRED) 840(n).

Still referring to FIG. 2, the CEPU 110-1 is coupled to a command center node with navigational layers, or a CCN NAVI 130-1. The CCN NAVI 130-1 includes a DTC-1 and a EGEN-1 910(n). The DTC-1 includes an alignment of navigational graphical user interface (GUI) layers such as the RSCP-1 and RSC-1. The DTC-1 also includes SRN-1, SRN-2, and SRN-3 and also RSCC-1, RSCC-2, and RSCC (n). The CCN NAVI 130-1 and CEPU 110-1 are coupled with the mobile resource node with navigational layers or the MRN NAVI 400-1.

In FIG. 2, the MRN NAVI 400-1 includes a DTC-1 and ESRV-1 920(n). Moreover, the DTC-1 includes RSCP-1 and RSC-1. The DTC-1 also includes an SRN-1, SRN-2, and SRN-3 along with RSCC-1, RSCC-2, and RSCC(n). The CEPU 110-1 and the CCN NAVI 130-1 can selectively control the flow of the MRN NAVI 400-1 as it travels through roadway segment cuboid channels according to its intended use. Moreover, the CEPU 110-1 and CCN NAVI 130-1 selectively control the MRN NAVI 400-1 to ensure that the MRN NAVI 400-1 follows the roadway policy depending on the type of node or intended use of the MRN NAVI 400-. As such, if the MRN NAVI 400-1 is a driverless vehicle, a drone, a public safety vehicle, the CEPU 110-1 and CCN NAVI 130-1 will selectively control the MRN NAVI 400-1 within the respective roadway segment cuboid channel so that the MRN NAVI 400-1 follows roadway policy. The CEPU 110-1 and CCN NAVI 130-1 also include a computing device that has a memory and processor and processing logic. The processing logic will enable the CEPU 110-1 and CCN NAVI 130-1 to acquire information on the MRN 400-1 and the RSCP-1 620-1 including the time and location and type of usage for both the MRN NAVI 400-1 and the RSCP-1 620-1.

In FIG. 2, within the NET 120-1, the DTC-1 610-1 is shown. Within the DTC-1 610-1, the roadway segment cuboid processor or RSCP-1 620-1 is illustrated. Three dimensional (3D) axis' x, y, z are shown. Stationary resource nodes SRN-1 500A-1, SRN-2 500B-1, and SRN-3 500C-1 are illustrated. The SRN-1 500A-1, SRN-2 500B-1, and SRN-3 500C-1 can include traffic lights, and signs to direct the MRN NAVI 400-1 on its route. The SRN-1 500A-1 will be positioned within the RSCP-1 620-1. The SRN-2 500B-1 will be positioned within both the RSCP-1 620-1 and RSC-1 630-1. The SRN-3 500C-1 will be positioned within the RSC-1 630-1. In addition, roadway segment cuboid channels RSCC-1 640A-1, RSCC-2 640B-1, RSCC-1 640A-2, RSCC-2 640B-2, RSCC(n) 640(n)-1, and RSSC(n) 640(n)-2 are shown. The MRN NAVI 400-1 will travel through any one of the RSCC-1 640A-1 to the RSCC(n) 640(n)-2 according to a roadway policy, or the intended use of the MRN NAVI 400-1. As mentioned above, should the MRN NAVI 400-1 be an emergency response vehicle, the MRN NAVI 400-1 can then travel through any of the roadway segment cuboid channels from RSCC-1 640A-1 to RSCC(n) 640(n)-2. The CEPU 110-1 and CCN NAVI 130-1 with the processing logic will be able to acquire the location and timing information on the MRN NAVI 400-1 and also the RSCP-1 620-1 as the MRN NAVI 400-1 travels through at least one of the RSCC-1 640A-1 to the RSCC(n) 640(n)-2. Moreover, the CEPU 110-1 and the CCN NAVI 130-1, using the processing logic, will acquire the type of use and time and location for both the RSCP-1 620-1 and also the MRN NAVI 400-1. Accordingly, the CEPU 110-1 will have information regarding a drone, or public safety vehicle, or even a driverless vehicle, including the time and location of such a vehicle, and thereby determine if acceptable usage has occurred for the MNR NAVI 400-1 and the RSCP-1 620-1.

With respect to FIG. 2, The SRS 510-1 is positioned below the RSCC(n) 640(n)-1 and the RSCC(n) 640(n)-2. The SRS 510-1 includes an ECPU-1 940. As such, the SRS 510-1 will be positioned to identify any incidents that occur with respect to the MRN NAVI 400-1 as it travels within the roadway segment cuboid channels RSCC-1 640A-1 to RSSC(n) 640(n)-2.

In FIG. 2, an MCN NAVI 150-1 is positioned underneath the roadway segment cuboid channels RSCC-1 640A-1 to RSCC(n) 640(n)-2. The MCN NAVI 150-1 includes navigational layers such as DTC-1, RSCP-1, and RSC-1. In addition, the MCN NAVI 150-1 also includes SRN-1, SRN-2, and SRN-3. Moreover, the MCN NAVI 150-1 also includes RSCC-1, RSCC-2 and RSCC(N) and EUSE-1 930(n). As such, the MCN NAVI 150-1 can also consume the one or more incidents relative to the MRN NAVI 400-1 as it travels through at least one of the roadway segment cuboid channels RSCC-1 640A-1 to RSCC(n) 640(n)-2 according to roadway policy.

In FIG. 2, overall, the CEPU 110-1 can collect the vital information on the MRN NAVI 400-1 in relation to the type of mobile node and its intended use (including bikes) and selectively control the MRN NAVI 400-1 within at least one of the roadway segment cuboid channels RSCC-1 640A-1 to RSCC(n) 640(n)-2 to ensure that the MRN NAVI 400-1 stays in its appropriate channel according to roadway policy and its intended use. The intended use can be where a driverless vehicle will have a different roadway segment cuboid channel as opposed to a drone or public transit vehicle. The appropriate channel will depend on the type of vehicle it is, such as a driverless vehicle, drone, public safety vehicle, or public transportation vehicle. Nevertheless, the CEPU 110-1 and CCN NAVI 130-1 can selectively control the flow of the MRN NAVI 400-1 as it travels through at least one of the roadway segment cuboid channels from RSSC 640A-1 to RSSC(n) 640(n)-2.

Figure 3A:
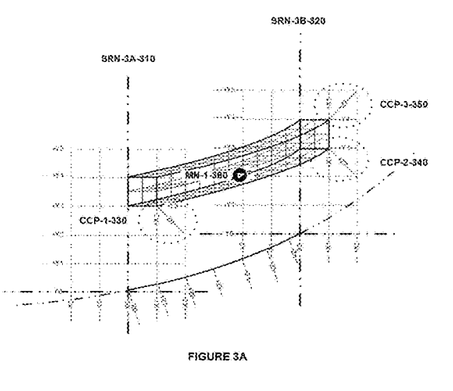
FIG. 3(A) illustrates a 3-D roadway segment cuboid and a roadway cuboid channel control with channel control points in accordance with embodiments of the disclosure.

Referring to FIG. 3(A), stationary resource nodes SRN-3A 310 and SRN-3B 320 are illustrated. These stationary resource nodes can be traffic signs or other guide posts that provide signs for the mobile nodes which travel through the roadway segment cuboid channels that are positioned within the event management system 300. Further, cuboid channel points CCP-1 330, CCP-2 340, and CCP-3 350 are shown.

In FIG. 3(A), the mobile node MN-1 360 is illustrated. The MN-1 360 is shown travelling through one of the roadway segment cuboid channels according to a roadway policy. As mentioned above in FIGS. 1 and 2, the cuboid event processing unit subsystem and a command center node subsystem will selectively control the flow of the MN-1 360 along with a roadway segment cuboid subsystem and also a roadway segment cuboid processing system as the MN-1 360 is travelling through at least one of the roadway segment cuboid channels. As a result, the cuboid event processing unit will acquire the information on the time and location of the MN-1 360 and also the roadway segment cuboid processor and the roadway segment cuboid. The information will be the type of use of the MN-1 360 and also for the roadway segment cuboid processor and the roadway segment cuboid.

Figure 3B:
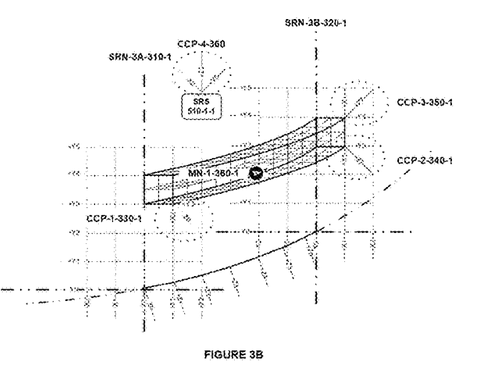
FIG. 3(B) illustrates a 3-D roadway segment cuboid and a roadway cuboid channel control with channel control points in accordance with embodiments of the invention.

Referring to FIG. 3(B), another embodiment of the event management system 300 is illustrated. Stationary resource nodes SRN-3A 310-1 and SRN-3B 320-1 are shown on their axis points. A mobile node MN-1 360-1 is shown travelling through one of the roadway segment cuboid channels according to a roadway policy. As in FIG. 3(A), a cuboid event processing unit with navigational layers and a command center node with navigational layers can selectively control the flow of the MN-1 360-1 and also a roadway segment cuboid processor and a roadway segment cuboid according to a roadway policy. The roadway policy will ensure that the MN-1 360-1 will travel within the specific roadway segment cuboid channel based on the intended use of the mobile node. However, if the MN-1 360-1 is an emergency response vehicle (ambulance), then the MN-1 360-1 can then travel within any of the roadway segment cuboid channels.

With respect to FIG. 3(B), the cuboid control points CCP-1 330-1, CCP-2 340-1, CCP-3 350-1, and CCP-4 360 are also illustrated. Further, CCP-4 360 also includes a stationary resource sensor 510-1-1. As such, the CCP-4-360 can collect any incidents or events of importance involving the MN-1 360-1, the roadway segment cuboid processor, and the roadway segment cuboid.

Figure 4A:
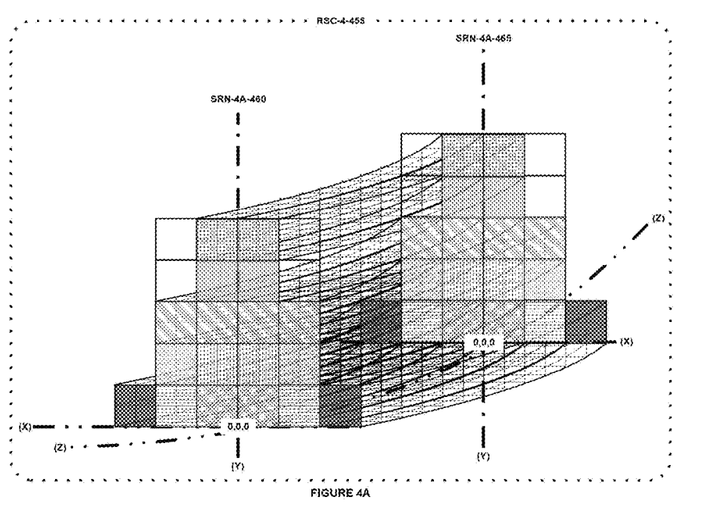
FIG. 4(A) illustrates a 3D roadway segment cuboid with usage channels in accordance with an embodiment of the invention.

In FIG. 4(A), another embodiment of the event management system 400. A roadway segment cuboid RSC-4 455 is shown. Within the RSC-4 455, stationary resource nodes SRN-4A 460 and SRN-4A 465 are illustrated on their axis. The mobile node will travel within the roadway segment cuboid channels shown. Moreover, the cuboid event processing unit and command center node with navigational layers will selectively control the flow of the mobile node within the roadway segment cuboid channels. Depending on the type of mobile node (driverless, drone, public safety), the mobile vehicle will be limited to travel within the roadway segment cuboid channel that it was intended for. Emergency response vehicles will be permitted to travel within any of the roadway segment cuboid channels. The cuboid event processing unit and the command center node with navigational layers will also selectively control the RSC-4 455. The cuboid event processing unit and command center node will also acquire information on the mobile node and the RSC-4 455. The information will include the type of use of the mobile node and a location and time duration of the mobile node as it travels through the roadway segment cuboid channel. In addition, the information will also include information on the type of use for the RSC-4 455. Moreover, the cuboid event processing unit will use the acquired information to identify and determine acceptable usage for both the mobile node and the RSC-4 455.

Figure 4B:
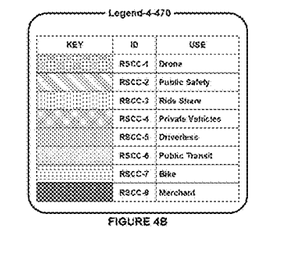
FIG. 4(B) illustrates a legend of FIG. 4(A) of the roadway segment cuboid channel User groups in accordance with an embodiment of the invention.

Referring to FIG. 4(B), a legend 470 is illustrated that shows the various variables which have been described in earlier figures mentioned above. Moreover the various roadway segment cuboid channels are shown for the different types of mobile nodes. The mobile node can be a drone, a public safety vehicle, a ride share vehicle, private vehicles, a driverless vehicle, public transit vehicle, a bike, and a merchant. The IDs RSCC- to RSCC-8 are also shown. Overall, the mobile node is selectively controlled by the cuboid event processing unit according to a roadway policy. The mobile node, depending on the use, is designated to travel a specific roadway segment cuboid channel that is designated for that type of mobile node. Emergency response vehicles will be permitted to travel within any one of the roadway segment cuboid channels.

Figure 4C:
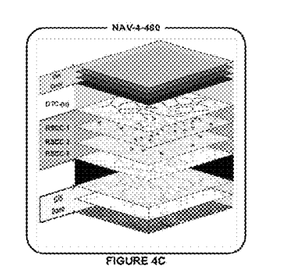
FIG. 4(C) illustrates a navigation stack with User group layers and a Digital Twin Cluster layer of Roadway Segment Cuboids in accordance with an embodiment of the invention.

In FIG. 4(C), navigational layers NAV-4 480 are illustrated. Use cases of mobile nodes are illustrated along with a digital twin cluster DTC-(n) and roadway segment cuboid channels RSCC-1 to RSCC-8. In addition, also illustrated is a geographic information system (GIS) base of information on the mobile node, digital twin cluster DTC-(n), and roadway segment cuboid channels RSCC-1 to RSCC-8.

Figure 5:
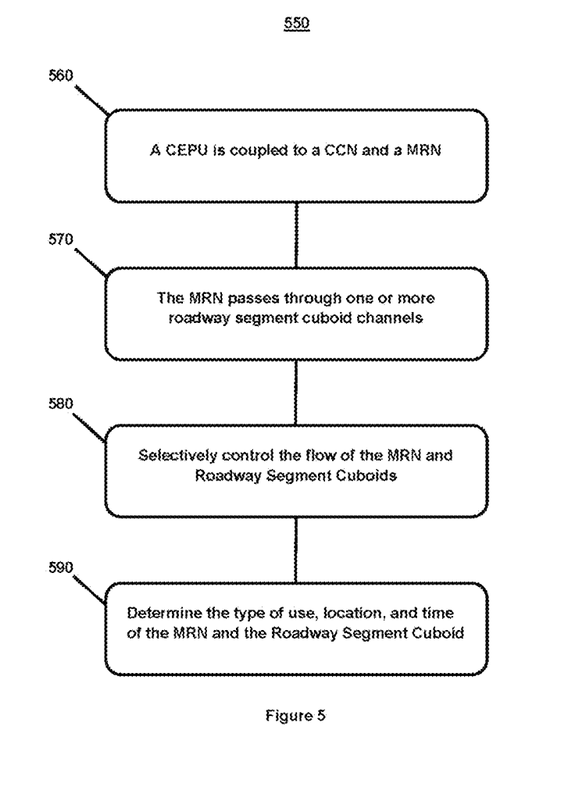
FIG. 5 illustrates a flowchart in accordance with an embodiment of the invention.

FIG. 5 illustrates a process 550 in accordance with an embodiment of the invention. The process 550 has been described in detail above in FIGS. 1-4(C).

In FIG. 5, at step 560, a cuboid event processing unit (CEPU) is coupled to a command center node (CCN). Both the CCN and CEPU include navigational layers. In addition, the CCN and CEPU are coupled to a mobile resource node (MRN) with corresponding navigational layers as well.

Referring to FIG. 5, at step 570, the MRN passes through one or more roadway segment cuboid channels. The MRN can be a driverless vehicle, drone, public safety vehicle, public transit vehicle, or even an emergency response vehicle. Roadway policies will in most instances limit the MRN to a specific roadway segment cuboid channel according to the intended use of the MRN. As such, drones, driverless vehicles, or public transportation vehicles will be selectively controlled. The CEPU will selectively control the MRN to travel within a specific roadway segment cuboid channel based on its intended use. An exception occurs for emergency response vehicles. Moreover, emergency response vehicles can travel within any of the roadway segment cuboid channels to respond to an incident event.

In FIG. 5, at step 580, the use, time, and location of the MRN and roadway segment cuboid is determined. The CEPU will selectively control the flow of the MRN and roadway segment cuboid, and thereby determine the type of use and the time and location for both the MRN and roadway segment cuboid accordingly.

Those skilled in the art will appreciate that the example embodiments are non-exhaustive and that embodiments other than that described here may be included without departing from the scope and spirit of the presently disclosed embodiments.

Advantages/Summary

Overall, within a roadway segment cuboid channel system, a cuboid event processing system can be connected to one or other processing units with navigational layers, include a command center node. Both the cuboid event processing unit and the command center node subsystem will also include a computing device with a memory, processor, and processing logic. As such, the cuboid event processing unit and command center node subsystem will be able to acquire information about any mobile node that travels within the roadway segment cuboid channel, the roadway segment cuboid processor, and the roadway segment cuboid.

The mobile node will travel within the roadway segment cuboid channels based on its intended use. The mobile node can be driverless, a bike, a merchant, a drone, driverless vehicle, and public transit vehicle. The cuboid event processing unit will selectively control the flow of the mobile node as it travels through the roadway segment cuboid channel. In other words, the mobile node will be designated to a particular roadway segment cuboid channel based on the type of mobile node that it is.

Another Key Advantage is the CEPU predictive capabilities to create clear unobstructed Roadway Segment Cuboids for Emergency Responders.

Another key advantage is that the cuboid event processing unit and command center node subsystem will know the time and location of the mobile node and the type of use of the mobile node. Moreover, the cuboid event processing unit will determine acceptable usage for both the mobile node and also for both the roadway segment cuboid processor and the roadway segment cuboid.

In summary, the cuboid event processing unit will be able to selectively control the mobile node's path based on its intended use and acquire information regarding the time and location of the mobile node and determine acceptable usage for the mobile node, roadway segment cuboid processor, and roadway segment cuboid.

CONCLUSION

All references, including granted patents and patent application publications, referred herein are incorporated herein by reference in their entirety.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Various aspects of the invention have been described above by way of illustration, and the specific embodiments disclosed are not intended to limit the invention to the particular forms disclosed. The particular implementation of the system provided thereof may vary depending upon the particular context or application. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

The corresponding structures, materials, acts, and equivalents of all means or step plus function elements in the claims below are intended to include any structure, material, or act for performing the function in combination with other claimed elements as specifically claimed.

What is claimed:

1. An event management system, comprising:
    at least a first nodal subsystem, the first nodal subsystem being associated with a Stationary Resource Node (SRN),
    at least a second nodal subsystem, the second nodal subsystem being associated with a Cuboid Event Processing Unit (CEPU),
    at least a third nodal subsystem, the third nodal subsystem being associated with a Mobile Node (MN),
    at least one 3D Roadway Segment Control (RSC) nodal subsystem, coupled to at least one or more distributed SRN subsystem(s) being located to selectively control a flow of at least one Mobile Node (MN) through a specific portion of a roadway;
    at least one CEPU nodal subsystem coupled to the at least one 3D RSC subsystem(s) being located to selectively control the flow of the at least one MN through the specific portion of the roadway;
    a communications network communicatively linking each of the at least one of the CEPU subsystem(s) and at the least one of the distributive 3D RSC subsystem(s) and at least one or more of the distributive SRN subsystem(s) and at least one MN subsystem to allow communications therebetween,
    wherein the at least one CEPU subsystem and the at least one MN subsystem and the one or more SRN subsystem(s) each includes a computing device comprising at least a memory, a processor and processing logic for execution in the processor,
    wherein the at least one 3D RSC nodal subsystem includes a computing device comprising at least a memory, a processor and processing logic for execution in the processor, wherein the processing logic is configured and arranged for acquiring information regarding the MN and 3D RSC subsystem, the information including a time and location of the MN and a location of the 3D RSC subsystem and a type of the MN functional use, and a type of the RSC subsystem allowable use for identifying and determining compliance of an event.

2. The event management system of claim 1, wherein the at least one CEPU subsystem includes the computing device that includes a graphic user interface (GUI).

3. The event management system of claim 1, wherein the at least one MN subsystem includes the computing device comprising a graphic user interface (GUI).

4. The event management system of claim 1, wherein the CEPU nodal subsystem selectively controls the at least one MN within its designated Roadway Segment Cuboid Channel (RSCC) accordingly to roadway policy.

5. The event management system of claim 1, wherein the at least one MN is placed on a preferred route within the specific portion of the roadway according to a roadway policy.

6. The event management system of claim 1, wherein the CEPU subsystem acquires the information that includes the time and location of the MN with the functional use of a Mobile Resource Node (MRN) ride-sharing vehicle.

7. The event management system of claim 6, wherein the CEPU subsystem acquires the information that includes the time and location of the MRN with the functional use of a ride-sharing vehicle and determines the allowable use within a uniquely identified Roadway Segment Cuboid Channel (RSCC) accordingly to a roadway policy.

8. An event management system, comprising:
a least first nodal subsystem, each of the first nodal subsystem being associated with a Stationary Resource Node (SRN),
at least a second nodal subsystem, each of the at least second nodal subsystem being associated with a Stationary Resource Sensor (SRS),
at least a third nodal subsystem, each of the at least third nodal subsystem being associated with a Cuboid Event Processing Unit (CEPU),
at least a fourth nodal subsystem, each of the at least fourth nodal subsystem being associated with at least one Mobile Node (MN),
at least one 3D Roadway Segment Control Processor (RSCP) nodal subsystem, coupled to at least one or more distributed SRN subsystem(s) and coupled to at least one or more distributed SRS node subsystem(s) being located to selectively control and measure usage of the at least one MN through a specific portion of a roadway;
at least one CEPU nodal subsystem, coupled to at the least one 3D RSCP subsystem(s) being located to control and measure usage of the at least one MN through the specific portion of the roadway;
a communications network communicatively linking each of the at least one of the CEPU subsystem(s) and the at least one distributive 3D RSCP subsystem(s), the at least one or more of the distributive SRN subsystem(s), the at least one or more distributed SRS subsystem(s), and at least one MN subsystem(s) to allow communications therebetween;
wherein the at least one CEPU subsystem(s), the at least one MN subsystem(s), and at the least one or more SRN subsystem(s) and at least one or more SRS subsystem(s) each includes a computing device comprising at least a memory, a processor and processing logic for execution in the processor,
wherein the at least one 3D RSCP nodal subsystem is coupled to at least one or more SRN subsystem(s) and the at least one or more SRS subsystem(s) and also includes a computing device comprising at least a memory, a processor and processing logic for execution in the processor, and
wherein the processing logic is configured and arranged for acquiring information regarding the MN and a RSCP, the information including a location of the MN and a location of the RSCP and a type of use of MN and a type of use for the RSCP to identify and determine acceptable Roadway Segment Cuboid Channel (RSCC) Usage.

9. The event management system of claim 8, wherein the information includes the MN having a functional use of an emergency response vehicle.

10. The event management system of claim 8, wherein the information includes the MN being a Mobile Constraint Node (MCN) with a functional use of a Private Passenger Vehicle.

11. The event management system of claim 9, wherein the at least one CEPU subsystem acquires the information that includes the location for an emergency response vehicle destination.

12. The event management system of claim 10, wherein the CEPU subsystem acquires the information that includes the time and location of a mobile constraint node (MCN) with a functional use of a Private Passenger Vehicle and determines an allowable use within a uniquely identified Roadway Segment Cuboid Channel (RSCC) according to a roadway policy.

13. The event management system of claim 8, wherein the at least one CEPU subsystem acquires the information about the MN that includes that the MN being a mobile constrate node (MCN) with a functional use of Driverless vehicle with specific portions of roadway lane authorization according to roadway policies.

14. The event management system of claim 13, wherein the CEPU subsystem coupled to the at least one RSCP subsystem coupled to the one or more SRS subsystem(s) determine that a mobile constraint node (MCN) with a functional use of driverless vehicle is in noncompliance of allowable portions of the roadway segment according to roadway assigned policies.

15. An event management system, comprising:
at least a first nodal subsystem, each of the at least first nodal subsystem being associated with a Cuboid Event Processing Unit (CEPU);
at least a second nodal subsystem, each of the at least second nodal subsystem being associated with a Stationary Resource Node (SRN);
at least a third nodal subsystem, each of the third nodal subsystem being associated with a Stationary Resource Sensor (SRS);
at least a fourth nodal subsystem, each of the at least fourth nodal subsystem being associated with a Mobile Node (MN);
one or more distributed 3D Roadway Segment Control Processor (RSCP) nodal subsystem(s), coupled to at least one or more distributed SRN subsystem(s) and coupled to one or more distributed Stationary Resource Sensor (SRS) node subsystem(s) and being located to selectively control and measure usage of the at least one MN through a specific portion of a roadway;

at least one CEPU nodal subsystem, coupled to the one or more distributed 3D RSCP subsystem(s) and being located to selectively control and measure usage of the at least one MN through the specific portion of the roadway; and a communications network communicatively linking each of the at least one of the CEPU subsystem(s) and the one or more distributive 3D RSCP subsystem(s) and at least one MN subsystem(s) to allow communications therebetween, the communications network communicatively linking each of the one or more 3D RSCP subsystem(s) and the one or more distributed SRN subsystem(s) and the one or more distributive SRS subsystem(s) to allow communications therebetween, wherein the one or more 3D RSCP nodal subsystem(s) are coupled to the at least one or more SRN subsystem(s) and the one or more SRS subsystem(s) that each include a computing device comprising at least a memory, a processor and processing logic for execution in the processor, wherein the one or more distributive 3D RSCP nodal subsystem(s) is coupled to at the least one CEPU subsystem(s), wherein the at least one CEPU subsystem(s) includes a computing device comprising at least a memory, a processor and processing logic for execution in the processor, wherein the at least one Mobile Node (MN) subsystem(s) includes a computing device comprising at least a memory, a processor and processing logic for execution in the processor, and wherein the processing logic of the CEPU is configured and arranged for acquiring information regarding the at least one MN and the one or more distributive 3D RSCP subsystem(s), the information including a location of the MN at a beginning of an event and the location and time duration of the MN at an end of the event and the one or more 3D RSCP subsystem(s) usage.

16. The event management system of claim 15, wherein the CEPU acquires the information that includes a length of time of a driverless vehicle on the specific portion of roadway.

17. The event management system of claim 15, wherein the CEPU acquires the information that includes that public safety vehicle(s) responding to an emergency.

18. The event management system of claim 17, wherein the CEPU determines a probable route of Roadway Segments for public safety vehicle(s) from historical information including the identified Roadway Segment usage.

19. The event management system of claim 18, wherein the CEPU selectively controls the one or more distributed SRN nodal subsystem(s) to selectively control the flow of one or more MN's away from a probable route of Roadway Segments according to roadway policy.

20. The event management system of claim 15, wherein the one or more distributed 3D RSCP nodal subsystem(s) selectively controls the flow of one or more drones within the specific portion of the roadway according to a roadway policy.

* * * * *